United States Patent [19]

Novak et al.

[11] Patent Number: 4,714,798

[45] Date of Patent: Dec. 22, 1987

[54] TITANIUM NITRIDE ELECTRODES FOR THERMOELECTRIC GENERATORS

[75] Inventors: Robert F. Novak, Farmington Hills; Duane J. Schmatz, Dearborn Heights; Thomas K. Hunt, Ann Arbor, all of Mich.

[73] Assignee: Ford Motor Company, Dearborn, Mich.

[21] Appl. No.: 813,170

[22] Filed: Dec. 24, 1985

[51] Int. Cl.$^4$ ............................................. H01L 35/14
[52] U.S. Cl. ..................................... 136/239; 136/237; 427/47; 427/38
[58] Field of Search ............... 106/299; 136/200–205, 136/236.1, 239; 429/193, 104, 11; 427/78, 126.1, 109, 255; 204/192 C, 192·SP

[56] References Cited

U.S. PATENT DOCUMENTS

| | | | |
|---|---|---|---|
| 3,458,356 | 7/1969 | Kummer | 136/83 |
| 4,042,757 | 8/1977 | Jones | 429/104 |
| 4,049,877 | 9/1977 | Sallient et al. | 429/11 |
| 4,052,738 | 10/1977 | Hosomi et al. | 204/192 C |
| 4,175,164 | 11/1979 | Cole | 429/11 |
| 4,209,552 | 6/1980 | Welch | 427/78 |
| 4,348,468 | 9/1982 | Wright | 429/193 |
| 4,510,210 | 4/1985 | Hunt | 429/11 |

*Primary Examiner*—Deborah L. Kyle
*Assistant Examiner*—T. J. Wallen
*Attorney, Agent, or Firm*—Lorraine S. Melotik; Roger L. May

[57] ABSTRACT

The invention is directed to a composite article suitable for use in thermoelectric generators. The article comprises a thin film of titanium nitride as an electrode deposited onto solid electrolyte. The invention is also directed to the method of making same.

17 Claims, No Drawings

TITANIUM NITRIDE ELECTRODES FOR THERMOELECTRIC GENERATORS

The invention disclosed herein was made under, or in the course of, Subcontract No. 4521610-Lawrence Berkeley Laboratory. Contract No. DE-AC03-765F00098.

TECHNICAL FIELD

This invention relates to a composite article comprising a thin film of titanium nitride as an electrode on solid electrolyte, which article is suitable for use in thermoelectric generators.

BACKGROUND OF THE INVENTION

Thermoelectric generator devices convert heat energy from a heat source directly to electrical energy. In one type of thermoelectric generator, the electrical energy is generated by electrochemically expanding alkali metal across a solid electrolyte. Such generators, wherein sodium metal is employed as the working substance, have been described in U.S. Pat. Nos. 3,458,356 and 4,510,210, and are commonly referred to as "sodium heat engines". This type of thermoelectric generator is discussed herein as exemplary of one type of generator in which the article of this invention may be suitably used.

The sodium heat engine generally comprises a closed container separated into a first and second reaction zone by a solid electrolyte. Liquid sodium metal is present in the first reaction zone (i.e., on one side of the solid electrolyte). In the second reaction zone (i.e., on the other side of the solid electrolyte), a permeable, electrically conducting electrode is in contact with the solid electrolyte. During operation of such a device, a heat source raises the temperature of liquid sodium metal within the first reaction zone to a high temperature and corresponding high vapor pressure, which creates a sodium vapor pressure difference across the solid electrolyte. In response to this pressure difference, the elemental sodium gives up electrons to the electrode in contact with the sodium metal and the resulting sodium ions migrate through the solid electrolyte. The electrons, having passed through an external load, neutralize sodium cations at the permeable electrode-solid electrolyte interface. Elemental sodium metal evaporates from the permeable electrode and migrates through the low pressure second reaction zone to a low temperature condenser. The condensed liquid sodium may then be returned back to the higher temperature first reaction zone.

In the thermoelectric generator system just described, the electrode on the surface of the electrolyte from which the alkali metal ions emerge is a positive electrode and must be present in order to transfer electronic charge from the external circuit to the alkali metal ions. This completes the electrochemical circuit required for operation of the generator. The operation of such thermoelectric generator systems require electrodes possessing special properties, some of which are difficult to optimize simultaneously. For example, it is necessary for efficient generator operation that the positive electrode conduct electrons from the electrical load to a broad surface of the electrolyte, doing so with low electrical resistance. At the same time, it is also necessary for the positive electrode to permit the passage of alkali metal atoms from the electrolyte-electrode interface through the electrode to the opposite electrode surface, from which they may pass to the condenser. While the former requirement is more likely to be attained by dense, thick electrodes to promote low resistance, the latter requirement suggests thin, permeable electrodes to promote the easy passage of the alkali metal through the electrode. Additionally, the electrodes must be relatively unreactive with the alkali metal and have low vapor pressure to prevent their loss through evaporation in the high temperature, high vacuum environment in which they operate. Still further, the electrode material must have a thermal expansion coefficient offering a fair match to that of the electrolyte substance. This is necessary in order to prevent delamination of the electrode from the electrolyte which could result from differential expansion and contraction of the electrode and electrolyte materials during the heating and cooling cycles to which such systems are exposed during use.

U.S. Pat. No. 4,049,877, to Saillant et al, is directed to a thermoelectric generator wherein the improvement comprises employing, as the electrode, a porous metal film deposited on the solid electrolyte by chemical vapor deposition. Among the metals taught as suitable for use as the electrode are molybdenum, tungsten, chromium, nickel and iron. Cole, in U.S. Pat. No. 4,175,164, teaches that the surface configuration of electrodes formed by chemical vapor deposition techniques (such as those in the above Saillant et al patent) may be modified by exposing such electrodes to oxidizing conditions, followed by reducing conditions. It is taught by Cole that these conditions effect an oxidation, reduction and consequent redeposition of the already deposited electrode which makes it desirably more porous, thus providing improved electrode efficiency. Both of these patents are commonly assigned with this application. However, these metal electrodes, while being capable of excellent power and efficiency in the initial stages of operation, have shown a tendency to lose power with operating time at high temperatures. It is believed that in the presence of oxygen and sodium, the refractory metal can form compounds which exhibit liquid phases at the temperatures of generator operation. Such liquid phases provide both a conducting path for sodium and good physical contact between electrode and electrolyte, resulting in the excellent initial power. Subsequent loss of these liquid phases through evaporation or decomposition leads to the power decrease observed.

DISCLOSURE OF THE INVENTION

This invention is directed to an article suitable for use in thermoelectric generators. The article comprises a thin film electrode of titanium nitride on solid electrolyte, wherein the electrode has a thickness of less than about 10 microns. Preferably, the electrode consists essentially of stoichiometric titanium nitride. A layer of titanium may be present between the titanium nitride electrode and the solid electrolyte to improve adhesion therebetween. The invention is also directed to methods for making the article described above. Preferably, such methods comprise depositing the titanium nitride electrode on the solid electrolyte by physical deposition methods selected from such deposition techniques as reactive sputtering, ion beam sputtering and ion plating.

The novel electrode materials of the present invention exhibit the aforementioned special properties desired for thermoelectric generators. Advantageously, the deposited titanium nitride electrode material appears to be essentially unreactive in an alakli metal environment, has a low vapor pressure, and adheres well to the surface of oxide ceramics including those known for use as the solid electrolyte in sodium heat engines such as beta"-alumina. The use of titanium nitride as the electrode material allows for further enhancement of the bond of the electrode-electrolyte interface, should such enhancement be desired, through deposition of a layer of pure titanium between the solid electrolyte and the titanium nitride. The titanium nitride electrode exhibits a high electronic conductivity (superior to that of pure titanium) at the 600°–1000° C. operating temperatures typical for such generators. Additionally, titanium nitride does not appear to yield any liquid phases over the operating temperatures typical for such thermoelectric generators and appears to be more resistant to morphological changes than the prior art electrodes of Saillant et al and Cole, principally the sputtered or chemically vapor deposited films of molybdenum. Still further, the present invention electrode is preferably deposited by physical deposition methods, e.g., sputtering techniques, which advantageously provide an especially economical and rapid means by which to apply the titanium nitride electrode layer. Additionally, such electrode application techniques allow for fabrication of electrode/electrolyte articles of thin cross section and/or unusual shapes.

DETAILED DESCRIPTION OF THE INVENTION

The present invention article comprises a thin film electrode of titanium nitride on solid electrolyte, wherein the electrode has a thickness less than about 10 microns. Generally, titanium nitride electrodes having a thickness of about 2 to 3 micrometers on a solid electrolyte appear to be appropriate for electrodes of adequate current carrying capacity in thermoelectric generators. Such titanium nitride electrodes generally have a surface resistance (often termed "sheet resistance") of less than about 30 ohms/square, more generally the surface resistance is between about 0.1 and about 30 ohms/square. The titanium nitride electrode may be deposited onto the solid electrolyte by any of a number of suitable physical deposition methods well known to those skilled in the art.

Exemplary of such physical deposition methods is the reactive sputtering of titanium in an atmosphere comprising nitrogen. During reactive sputtering, the titanium "reacts" with the nitrogen to form the titanium nitride as it deposits onto the solid electrolyte. In reactive sputtering, a main sputtering chamber consists of a vacuum system containing a dc magnetron sputtering gun with a titanium target to which a large negative voltage is applied. Flow meters regulate the amount of nitrogen and inert gas, which is preferably argon, admitted into the system and the vacuum pumping system can be throttled to permit operation at a prescribed pressure developed by the gases. A usual operating pressure range is 1.5 to 5 millitorr, but can be as high as 10 millitorr. Argon flow rates are selected based on the size of the chamber and the pumping rate of the vacuum pumping system employed. For example, the argon flow rates for the reactive sputtering chamber of Examples 1–4 having a volume of 200 liters are optimally in the range of 10–28 standard cubic centimeters per minute (sccm); typically 16 sccm is used. The reactive sputtering process begins with setting the inert gas flow rate and adjusting the pressure, whereafter the high voltage is turned on and the current is set. A plasma of positively charged inert gas ions is formed and ions are attracted to the negatively charged titanium target. Nitrogen is then admitted to the system. An exchange of energy occurs between the inert gas ion and titanium so that a titanium atom is dislodged, to be redeposited, and simultaneously reacted with nitrogen, on any substrate in its line of sight. In this invention, it is deposited on the solid electrolyte. The solid electrolyte article is brought near the plasma at a selected distance. Generally, to produce a uniform film over an entire substrate, e.g., a solid electrolyte tube, requires that the tube be rotated. Reactive sputtering techniques are discussed in "Reactive Sputter Deposition. A Quantitative Analysis", D. K. Hohnke, D. J. Schmatz and M. D. Hurley, Thin Solid Films, 118, 301–310 (1984), which article is hereby expressly incorporated by reference for such teachings.

While one physical deposition technique, i.e., reactive sputtering, has been discussed in detail above, such discussion is not meant to limit the deposition of the titanium nitride onto the solid electrolyte in this invention to deposition by reactive sputtering techniques. Other deposition methods, suitable for use in this invention, for applying the titanium nitride onto the solid electrolyte are described in "Deposition Technologies for Films and Coatings", R. F. Bunshah. Editor, Noyes Publications, Park Ridge, N.J., 1982, which text is hereby expressly incorporated by reference for its teaching relative physical deposition techniques. Still other physical deposition methods, suitable for applying the titanium nitride to the solid electrolyte, are known to those skilled in the art and would be apparent in view of the present disclosure. For example, the titanium nitride can be deposited by ion beam sputtering of a titanium target in a nitrogen/inert gas atmosphere. Ion plating is still another method which may be used to deposit the titanium nitride and comprises using either arc or electron beam evaporation of titanium in a nitrogen/inert gas atmosphere. The titanium nitride may also be deposited by physical deposition techniques which are not "reactive" in that they do not require the reaction of nitrogen and titanium to form the titanium nitride. For example, the titanium nitride may be redeposited by sputtering techniques from a titanium nitride target in an argon atmosphere. In this instance, dc magnetron sputtering or radio frequency (rf) magnetron sputtering from a titanium nitride target in an inert gas atmosphere may be employed to deposit the titanium nitride onto the solid electrolyte. Generally, in the physical deposition methods discussed above the inert gas preferably employed in argon. While the titanium nitride may be deposited by any of numerous physical deposition methods, as described herein, the titanium nitride electrodes of this invention are most conveniently deposited on the the solid electrolyte by reactive sputtering of titanium metal in the presence of a controlled pressure of nitrogen/argon gas.

In any method of depositing titanium nitride electrode onto the solid electrolyte, including the preferred reactive sputtering method, the conditions are most advantageously arranged so as to produce a film consisting essentially of stoichiometric titanium nitride. Electrodes of essentially stoichiometric titanium nitride have better chemical stability, lower electrical resistance and better electrode-electrolyte bonding than non-stoichiometric titanium nitride electrodes. In reactive sputtering, ion plating or ion beam sputtering of a titanium target in a nitrogen atmosphere, reaction of an equal number of nitrogen ions with titanium ions will produce stoichiometric titanium nitride. Parameters such as gas pressure, gas flow rate, power input, distance from target to the substrate can be varied, while maintaining formation of essentially stoichiometric titanium nitride. This can be accomplished, for example, by setting the power level and adjusting the nitrogen flow or by setting the nitrogen flow and adjusting the power level. It has generally been found, for example, in reactive sputtering that essentially stoichiometric titanium nitride is formed when the ratio of the power to the nitrogen flow rate is generally in the range of 140–175 watts/sccm, preferably, when this range is 145–165 watts/sccm. As would be apparent to those in the art, essentially stoichiometric titanium nitride can also be deposited from titanium nitride targets in the presence of inert gases. Selection of the optimal operating parameters to produce the preferred stoichiometric titanium nitride would be dependent on the particular physical deposition method employed for depositing the titanium nitride film, and selection of such optimal operating parameters would be within the skill of those in the art in view of the present disclosure. It is possible to vary the methods and conditions of deposition over a considerable range while producing electrodes capable of acceptable thermoelectric generator operation.

The morphology of the deposited titanium nitride films can be varied considerably while maintaining an essentially stoichiometric titanium nitride electrode composition by adjusting the aforementioned parameters. The requisite easy transport of neutral alkali metal atoms through the titanium nitride electrode may be affected by the film morphology. It has been found that, e.g., in reactive sputtering, pressure along with the temperature affects the structure of the deposited titanium nitride film which can, during deposition, be made more dense at lower operating pressures and higher temperatures and more porous at higher operating pressures and lower temperatures. It has further been found that, e.g., in reactive sputtering, the structure of the titanium nitride electrode can be made to grow with an equiaxed compact grain structure at low pressures and high temperatures and with a columnar or open fibrous structure (growth perpendicular to the solid electrolyte surface) at higher pressures and lower temperatures. It is believed that the columnar structure is more conducive to transport of the alkali metal through the titanium nitride film. However, while such columnar structure appears to be preferred, the invention article of this invention is not limited to such columnar titanium nitride electrodes.

As has been previously mentioned herein, a layer of titanium may be present between the titanium nitride electrode and the solid electrolyte. Such a layer of titanium enhances the bond at the electrode-electrolyte interface, should such be desired. The titanium can be deposited by some of the physical deposition methods previously described herein for depositing the titanium nitride as would be apparent to those in the art in view of the present disclosure. Generally, if a layer of titanium is employed between the titanium nitride and the solid electrolyte, it is generally employed in a thickness of between about 10 and about 20 Å.

The solid electrolyte of the article of this invention may be selected from a wide range of glass or polycrystalline ceramic materials which are commercially available and known to those skilled in the art. Among the glasses which may be used with thermoelectric generators employing alkali metals as working substances and which demonstrate unusually high resistance to attack by alkali metal are those having one of the two following compositions: (1) between about 47 and about 58 mole percent sodium oxide, about 0 to about 15, preferably about 3 to about 12, mole percent aluminum oxide, and about 34 to about 15 mole percent silicon dioxide; and (2) about 35 to about 65, preferably about 47 to about 58, mole percent sodium oxide, about 0 to about 30, preferably about 20 to about 30, mole percent aluminum oxide, and about 20 to about 50, preferably about 20 to about 30, mole percent boron oxide. These glasses may be prepared by conventional glass making procedures using the listed ingredients and firing at temperature of about 2700° F.

Polycrystalline ceramic materials desirable as the solid electrolyte are bi- or multi- metal oxides. Among the polycrystalline bi- or multi- metal oxides most useful in thermoelectric generators are those of beta-type-alumina, generally sodium beta-type-alumina. There are two well-known crystalline forms of beta-type-alumina materials, beta-alumina and beta''-alumina, both of which demonstrate the generic beta-type-alumina crystalline structure comprising various layers of aluminium oxide held apart by layers of Al-O bond chains with, in the case of sodium beta or beta''-alumina, sodium ions occupying sites between the aforementioned layers and columns. Among the numerous polycrystalline beta-type-alumina materials useful as the solid electrolyte are the following.

1. Standard beta-type-alumina formed from compositions comprising at least about 80 percent by weight, preferably at least about 85 percent by weight of aluminum oxide and between about 5 and about 15 weight percent, preferably between about 8 and about 11 weight percent sodium oxide. Beta-alumina is a crystalline form which may be represented by the formula $Na_2O.11Al_2O_3$. The second crystalling form, beta''-alumina, may be represented by the formula $Na_2O.5Al_2O_3$. It will be noted that the beta''-alumina form contains approximately twice as much soda (sodium oxide) per unit weight of material as does the beta-alumina form. It is the beta''-alumina crystalline form which is preferred for use as the solid electrolyte of this invention. Each of these beta-type-alumina crystalline forms can be easily identified by its own characteristic X-ray diffraction pattern.

2. Boron oxide, $B_2O_3$, modified beta-type-alumina, wherein about 0.1 to about 1 weight percent of boron oxide is added to the composition.

3. Substituted beta-type-alumina, wherein the sodium ions of the composition are replaced, in part or in whole, with other positive ions which are preferably metal ions, e.g., potassium ions, lead ions, etc.

4. Beta-type-alumina which is modified by the addition of a minor proportion by weight of metal ions having a valence not greater than 2, such that the modified beta-type-alumina composition comprises a major porportion by weight of ions of aluminum and oxygen and a minor proportion by weight of a metal ion in crystal lattice combination with cations which migrate in relation to the crystal lattice as the result of an electric field. The preferred embodiment for use in such electrical conversion devices is that wherein the metal ion having a valence not greater than 2 is either lithium or magnesium or a combination of lithium and magnesium and the cation is sodium. These metals may be included in the composition in the form of lithium oxide or magnesium oxide or mixtures thereof in amounts ranging from 0.1 to about 5 weight percent. These metal ions, e.g., lithium, are generally added to stabilize the beta"-alumina in that form. Otherwise, at high temperatures, the beta"-alumina has a tendency to convert to the beta-alumina form. It is this stabilized beta"-alumina form which is preferred for the solid electrolyte material of this invention.

The solid electrolyte is shaped so as to conform with the design considerations of the thermoelectric generator. For example, in the previously mentioned patent to Saillant et al, the solid electrolyte is a tube closed at one end. Generally, such tubes have a wall thickness of about 0.1 centimeters or less. The solid electrolyte of the article of this invention is, however, not limited to any particular shape. The physical deposition method described in this invention for applying the titanium nitride advantageously allows for applying titanium nitride electrodes to solid electrolytes of unusual shapes. With the advent of beta-type-alumina or other ceramics of high structural integrity, solid electrolyte wall thicknesses are as low as 100 microns or less. It has been discovered that reducing the thickness of the solid electrolyte improves overall efficiency by reduction of bulk resistance.

The following examples illustrate the preferred aspects of this invention but are not meant to limit the scope of this invention. Those in the art will appreciate that many modifications can be made within the scope of the invention that will achieve the electrode articles of this invention.

METHOD FOR TESTING POWER OUTPUT AND SURFACE RESISTANCE OF ELECTRODES

The testing of sodium heat engine electrodes is initiated by assembling the electrolyte tube coated with the titanium nitride electrode into a complete sodium heat engine cell. The electrode performance is generally determined by measuring the current/voltage relationship of the electrode as a function of temperature. Electrical leads are connected to the sodium metal in the aforementioned first reaction zone of the cell, the sodium metal being the negative electrode, and to the positive electrode comprising the titanium nitride film carried on the solid electrolyte in the second reaction zone. Between these two leads, a variable resistance and a current meter are placed in serie. Changes in the resistance are then used to sweep the current delivered to this circuit by the sodium heat engine system through a range of values and the current in the circuit and the cell voltage are recorded on the axes of an X-Y recorder. The maximum power output of the electrode can then be determined graphically by examination of the I-V relation. The in-plane or "surface" electronic resistance (often referred to as "sheet" resistance) of the electrode can be measured by the conventional 4-terminal methods known to those skilled in the art. Values of surface resistance are generally given in units of ohms per square, the resistance between opposite edges of a square section of the film.

EXAMPLE 1

A reactive sputtering chamber consisting of a vacuum system comprising a dc magnetron sputtering gun with a titanium target was used to deposite the titanium nitride electrode on a beta"-alumina tube in this example. A pressure of 2.0 millitorr was developed in the throttled vacuum system within the chamber with a flow of 16 sccm of argon. A current of 1.6 amperes was set and nitrogen was admitted slowly to the system at a rate of 4.4 sccm. These conditions developed a voltage of 445 volts and power of 712 watts, producing a value of 162 watts/sccm nitrogen. A beta"-alumina tube was moved from the load lock chamber within the system to a position under the titanium target and sputter coated for 1 hour, producing a film of essentially stoichiometric titanium nitride having a thickness of approximately 3 micrometers on the tube. The power output and surface resistance of the electrode were measured by the methods described above. The surface resistance of the electrode was 0.8 ohms/square and the maximum power output observed was 0.74 watts/cm$^2$ at 900° C.

EXAMPLE 2

Reactive sputtering was employed to deposit titanium nitride onto a beta"-alumina tube in this example by means of the reactive sputtering chamber described in Example 1. In this example, a pressure of 3.5 millitorr was developed in the throttled vacuum system within the chamber with a flow of 16 sccm of argon. A current of 1.7 amperes was set and nitrogen was admitted slowly to the system at a rate of 3.75 sccm. These conditions developed a voltage of 360 volts and power of 612 watts, producing a value of 163 watts/sccm nitrogen. A beta"-alumina tube was moved from the load lock chamber within the system to a position under the titanium target and sputter coated for 1 hour, producing a film of essentially stoichiometric titanium nitride having a thickness of approximately 2.7 micrometers on the tube. The power output and surface resistance of this electrode were measured by the general methods described above. This surface resistance of the electrode was 0.5 ohms/square and the power output reached a maximum of 0.45 watts/cm$^2$ at 880° C.

EXAMPLE 3

Reactive sputtering was employed to deposit titanium nitride onto a beta"-alumina tube in this example by means of the reactive sputtering chamber described in Example 1. A higher current than that of Example 1 is used to produce a thicker titanium nitride film in the same time or a film of the same thickness in a shorter time. In this example, a pressure of 2.5 millitorr is developed in the throttled vacuum system within the chamber with a flow of 16 sccm of argon. A current of 2.5 amperes is set and nitrogen is admitted slowly at a rate of 6.0 sccm. These conditions produce a voltage of 400 volts and a power of 1000 watts, producing a value of 167 watts/sccm nitrogen. A beta"-alumina tube is moved from the load lock chamber within the system to a position under the titanium target and sputter coated for 30 minutes, producing a film of essentially stoichiometric titanium nitride having a thickness of about 2.5 micrometers. The surface resistance and the power output of the electrode is expected to be approximately 0.7 ohms/square and 0.5 watts/cm$^2$ at 900° C., respectively.

EXAMPLE 4

The method of Example 1 is used to apply an essentially stoichiometric titanium nitride electrode layer to an electrolyte body comprising a borosilicate glass tube, the composition of which is given approximately by $(Na_2O)_{0.2}(SiO_2)_{0.5}(B_2O_3)_{0.3}$. The electrode film thickness is about 0.1 micrometer. (Electrode films are preferably made thinner when electrolytes of the glass type, having lower ionic conductivity than the beta-type-aluminas, are used as reaction zone separators in thermoelectric generators of the sodium heat engine type.) The power level and the surface resistance of the electrode is expected to be about 0.02 watts/cm² at 600° C. and about 13 ohm/square, respectively.

EXAMPLE 5

In this example, reactive ion-plating is used to deposit a titanium nitride electrode onto a beta″-alumina tube. The plating is carried out in an ion plating chamber having a vacuum system comprising a electron beam. Titanium is vaporized from a titanium target by the electron beam. The vaporized titanium passes through a gaseous glow discharge on its way to the beta″-alumina tube, which ionizes some of the vaporized atoms. The glow discharge is produced by biasing the beta″-alumina tube to a high negative potential (3 KV) and admitting argon into the throttled vacuum system within the chamber at a pressure of about 20 millitorr. The tube is bombarded by high energy gas ions which effectively clean the surface. Nitrogen is then admitted to the chamber which allows the deposition of titanium nitride on the beta″-alumina tube. The composition is determined empirically from the power and nitrogen flow rates. The tube holder is made of titanium. (Beta″-alumina is an insulator. Since the beta″-alumina tube must be held in some manner and the holder will have high negative voltage, in the course of the process the material of the holder may be sputtered and redeposited on the tube. Thus the holder is preferably made of titanium.) The electrode is applied to a thickness of approximately 2 micrometers. The surface resistance and the power output of the electrode is expected to be approximately 0.8 ohm/square and 0.4 watts/cm² at 800° C., respectively.

We claim:

1. An article suitable for use in thermoelectric generators, which article comprises a solid electrolyte and a film of titanium nitride adhering to the surface of said solid electrolyte, said film having a thickness less than about 10 microns.

2. An article according to claim 1, wherein said film has a thickness of between about 2 and about 3 microns.

3. An article according to claim 1, wherein said film consists essentially of stoichiometric titanium nitride.

4. An article according to claim 1, wherein a layer of titanium is present between said titanium nitride and said solid electrolyte.

5. An article according to claim 4, wherein said layer of titanium has a thickness between about 10 and about 20 Angstroms.

6. An article according to claim 1, wherein said titanium nitride is deposited onto said solid electrolyte by a physical deposition method selected from (i) reactive sputtering of titanium in a nitrogen/inert gas atmosphere, (ii) ion plating of titanium in a nitrogen/inert gas atmosphere, (iii) ion beam sputtering of titanium in a nitrogen/inert gas atmosphere, (iv) dc megretron sputtering of titanium nitride in an inert gas atmosphere, and (v) rf sputtering of titanium nitride in an inert gas atmosphere.

7. An article according to claim 1, wherein said solid electrolyte comprises beta-type-alumina.

8. An article according to claim 1, wherein said solid electrolyte comprises beta″-alumina.

9. A method for making an article suitable for use in thermoelectric generators, which article comprises a solid electrolyte and a film of titanium nitride adhering to the surface of said solid electrolyte, which method comprises:
depositing titanium nitride onto a solid electrolyte to a thickness of less than about 10 microns.

10. A method according to claim 9 wherein said film has a thickness of between about 2 and about 3 microns.

11. A method according to claim 9, wherein said film consists essentially of stoichiometric titanium nitride.

12. A method according to claim 9, wherein said method comprises depositing a film of titanium onto said solid electrolyte prior to depositing said film of said titanium nitride on said solid electrolyte.

13. A method according to claim 12, wherein said layer of titanium has a thickness between about 10 and about 20 Angstroms.

14. A method according to claim 9 wherein said titanium nitride film is deposited by a physical deposition method selected from (i) reactive sputtering of titanium in a nitrogen/inert gas atmosphere, (ii) ion plating of titanium in a nitrogen/inert gas atmosphere, (iii) ion beam sputtering of titanium in a nitrogen/inert gas atmosphere, (iv) dc magnetron sputtering of titanium nitride in an inert gas atmosphere, and (v) rf sputtering of titanium nitride in an inert gas atmosphere.

15. A method according to claim 9, wherein said solid electrolyte comprises beta-type-alumina.

16. a method according to claim 15, wherein said solid electrolyte comprises beta″-alumina.

17. An article suitable for use in thermoelectric generators, which article comprises a solid electrolyte and a film of essentially stoichiometric titanium nitride adhering to the surface of said solid electrolyte, said film having a thickness less than about 10 microns and said solid electrolyte comprising beta-type-alumina.

* * * * *